United States Patent [19]

Park et al.

[11] Patent Number: 4,681,715
[45] Date of Patent: Jul. 21, 1987

[54] STEAM EXPANDABLE POLYMERIC COMPOSITION AND METHOD

[75] Inventors: Chung P. Park, Pickerington; Gerald A. Garcia, Newark, both of Ohio

[73] Assignee: The Dow Chemical Company, Midland, Mich.

[21] Appl. No.: 777,992

[22] Filed: Sep. 20, 1985

Related U.S. Application Data

[63] Continuation-in-part of Ser. No. 672,001, Nov. 16, 1984.

[51] Int. Cl.$^4$ .............................................. C08V 9/14
[52] U.S. Cl. ................. 264/53; 264/DIG. 5; 264/DIG. 18; 521/79; 521/81; 521/91; 521/146; 521/154; 521/918
[58] Field of Search ............ 264/53; 521/79, 81, 521/146, 910, 91, 154, 918

[56] References Cited

U.S. PATENT DOCUMENTS

| | | |
|---|---|---|
| 4,421,866 | 12/1983 | Suh et al. ............................... 521/79 |
| 4,438,224 | 3/1984 | Suh et al. ............................... 521/79 |
| 4,446,253 | 5/1984 | Hahn et al. ............................. 521/79 |
| 4,451,417 | 5/1984 | Akiyama et al. ...................... 521/79 |
| 4,452,751 | 6/1984 | McCullough et al. ................ 521/79 |
| 4,515,907 | 5/1985 | McCullough et al. ................ 521/79 |

Primary Examiner—Morton Foelak
Attorney, Agent, or Firm—B. M. Kanuch

[57] ABSTRACT

A steam expandable alkenyl aromatic polymer composition and methods of preparation are provided. The composition is mixed with a volatile blowing agent containing, as a primary blowing agent, dichlorodifluoromethane and as a secondary blowing agent, a halogenated hydrocarbon, a hydrocarbon, or an aliphatic alcohol containing from 1 to 4 carbon atoms, the secondary blowing agent having a normal atmospherpic boiling point of from about 0° to about 100° C. The composition may be expanded by steam immediately after extrusion foaming or may be expanded after aging of the composition which has been impregnated with volatile blowing agent.

13 Claims, 4 Drawing Figures

STEAM EXPANDABLE POLYMERIC COMPOSITION AND METHOD

CROSS-REFERENCE TO RELATED APPLICATIONS

This application is a continuation-in-part of U.S. application Ser. No. 672,001, filed Nov. 16, 1984.

BACKGROUND OF THE INVENTION

This invention relates to a steam expandable polymeric composition and method of preparation, and more particularly to a steam expandable aklenyl aromatic polymer composition with mixed volatile blowing agent and methods of expanding the composition in atmospheric steam.

Steam expansion is a widely applied technology in preparing a styrenic polymer foam. Atmospheric steam (i.e., steam at atmospheric pressure) is often used to expand expandable polystyrene (EPS) resins. Both on-line and off-line steam expansion techniques have been utilized.

On-line steam expansion occurs immediately following extrusion of expanded polystyrene foam. For example, Japan Kokai published application No. 42-24071 discloses that steam may be used to expand polystyrene foam at the die of a foam extrusion line. Off-line steam expansion utilizes steam to expand polystyrene resin particles which have been impregnated with a volatile blowing agent. For example, both Kajimura, U.S. Pat. No. 3,994,840, and Yamai, U.S. Pat. No. 4,065,411, teach impregnation of polystyrene particles with a volatile blowing agent such as n-pentane, aging the expandable particles, and then expanding the particles to a cellular foamed structure by exposure to steam.

However, most commonly used blowing or expanding agents have a deficiency either in the rate of expansion of the polymer, the degree of expansion of the polymer, or the final properties of the expanded polymeric foam. For example, a polystyrene foam expanded with a mixture of dichlorodifluoromethane (FC-12) and methyl chloride expands too slowly and to too low a degree in steam to be practical for commercial activity. A polystyrene foam made with pure trichloromonofluoromethane or pentane expands rapidly in steam but has several deficiencies in expansion characteristics, results in a softening of the final foam structure, and prevents expansion of the foam to very low densities.

Accordingly, the need exists in the art for a steam expandable alkenyl aromatic polymer composition and method for preparation which provides rapid expansion of the composition in steam to very low densities without adversely affecting the final properties or structure of the foam.

SUMMARY OF THE INVENTION

The present invention meets that need by providing a steam expandable polymeric composition and process which expands rapidly to very low densities. According to one aspect of the invention, the expandable composition comprises an alkenyl aromatic polymer having a glass transition temperature between about 60° to about 100° C. together with a volatile blowing agent. The volatile blowing agent comprises a mixture of from about 40 to about 90% by weight of a primary blowing agent comprising dichlorodifluoromethane (FC-12) and from about 10 to about 60% by weight of a secondary blowing agent comprising a halogenated hydrocarbon, a hydrocarbon, or an aliphatic alcohol containing from 1 to 4 carbon atoms, the halogenated hydrocarbon, hydrocarbon, or aliphatic alcohol having a normal atmospheric boiling point of from about 0° to about 100° C. Optionally, small amounts of a silane crosslinking agent may also be added.

It has been found that this combination of alkenyl aromatic polymer and mixed blowing agent provides a rapidly expanding composition in atmospheric steam to low densities [i.e., below about 2.0 pcf (32.0 Kg/m$^3$)]. In addition to having a glass transition temperature (Tg) between about 60° to about 100° C., the polymer preferably has a weight average molecular weight of equal to or less than about 250,000. Such molecular weight may be determined by gel permeation chromatography (GPC), for example. The blowing agent is selected to have adequate solubility to plasticize the polymer. Thus, the unique plasticizing effect of the secondary blowing agent also helps lower the glass transition temperature of the polymer thereby facilitating steam expansion. The secondary blowing agent then diffuses out of the composition without any adverse effect on the final foam properties. This is particularly advantageous since other plasticizing agents such as solid or liquid compounds mixed into the polymer will permanently remain in the final cellular structure.

The expandable composition of the present invention may be used to produce a very low density moldable material by off-line expansion and also produce a lower density extruded foam by on-line application of steam. To produce the very low density moldable material, the volatile mixed blowing agent of the present invention is impregnated into a granular alkenyl aromatic polymer having a glass transition temperature between about 60° to about 100° C. The polymer impregnated with blowing agent may then be heated to activate the blowing agent and expand the composition. Steam may be used to provide the heat for this initial expansion, or alternatively, the expanded composition may be subjected to further single or multiple expansions in the presence of atmospheric steam.

A low density extruded foam may be produced in accordance with the present invention by melt processing under pressure an alkenyl aromatic polymer having a glass transition temperature between about 60° to about 100° C. with the mixed volatile blowing agent of the present invention to form a flowable admixture. The admixture is then extruded through a die to a zone of lower pressure where the blowing agent is activated to expand the composition to a cellular structure. This cellular foam is then exposed to atmospheric steam to cause further expansion of the foam to even lower densities. The exposure of the admixture to lower pressure and to atmosphere steam may occur substantially simultaneously.

Accordingly, it is an object of the present invention to provide a steam expandable polymeric composition and method of preparation which provides rapid expansion of the composition in steam to very low densities and without adverse affect on the final properties of the foam structure. This and other objects and advantages of the invention will become apparent from the following detailed description, the accompanying drawings and the appended claims.

DETAILED DESCRIPTION OF THE PREFERRED EMBODIMENTS

Figure 1:
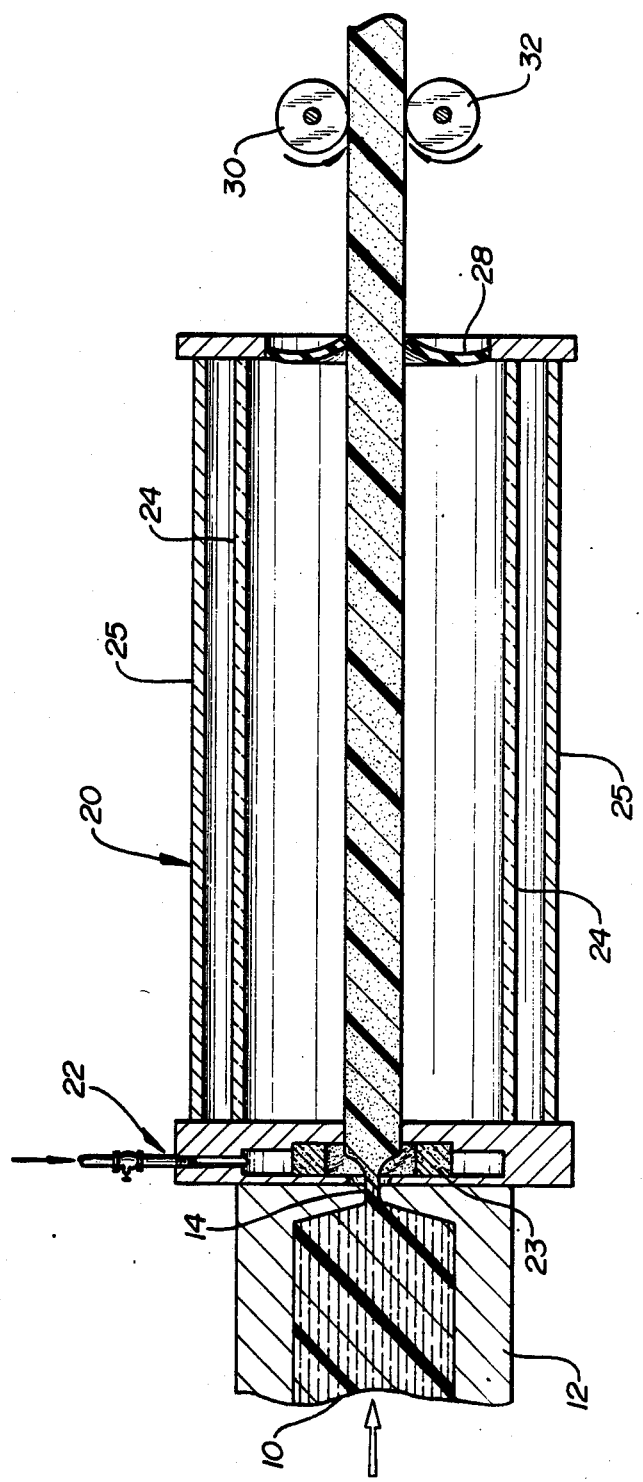
FIG. 1 is a schematic diagram of a steam chamber for the on-line expansion of polymeric foam.

The expandable polymeric composition of the present invention comprises an alkenyl aromatic polymer resin having a glass transition temperature of between about 60° to about 100° C. and having a weight average molecular weight equal to or less than about 250,000.

By the term "alkenyl aromatic polymer" resin, is meant a solid polymer of one or more polymerizable alkenyl aromatic compounds and, optionally, at least one copolymerizable monomer. The polymer or copolymer comprises, in polymerized form, at least 70% by weight of at least one alkenyl aromatic monomer having the general formula:

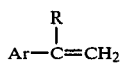

where Ar represents an aromatic hydrocarbon radical, or an aromatic halo-hydrocarbon radical of the benzene series, and R is hydrogen, a methyl group, or an ethyl group. Examples of such alkenyl aromatic polymers are the solid homopolymers of styrene, α-methylstyrene, o-methylstyrene, m-methylstyrene, p-methylstyrene, ar-ethylstyrene, ar-vinylxylene, ar-chlorostyrene, or ar-bromostyrene, the solid copolymers of two or more of such alkenyl aromatic compounds with minor amounts of other readily polymerizable olefinic compounds such as acrylonitrile, anhydrides of maleic or itaconic acids, or rubber-reinforced (either synthetic or natural) styrene polymers, and the like.

The blowing agent of the present invention comprises a mixture of a primary and a secondary blowing agent. The primary blowing agent comprises dichlorodifluoromethane in an amount of from about 40 to about 90% by weight, and preferably about 60 to about 80% by weight, of total blowing agent. The secondary blowing agent comprises a halogenated hydrocarbon, a hydrocarbon, or an aliphatic alcohol containing from 1 to 4 carbon atoms, wherein the secondary blowing agent has a normal atmospheric boiling point of from about 0° to about 100° C., in an amount of from about 10 to about 60% by weight, and preferably about 20 to about 40% by weight, of total blowing agent.

It has been found that this combination of primary and secondary blowing agents in the weight percentages given above provide, in combination with the alkenyl aromatic polymer of the present invention, a composition which is readily and rapidly expandable in atmospheric steam to very low densities below about 0.6 pcf (9.6 Kg/m$^3$). The unique plasticizing effect of the secondary blowing agents aid in lowering the glass transition temperature of the polymer rendering it readily expandable in atmospheric steam. After expansion, the secondary blowing agent diffuses out of the cellular structure. However, the use of too much secondary blowing agent, above the percentage range disclosed above, may cause too much plasticizing effect on the composition resulting in a permanent softening of the final cellular structure and an inability to expand the composition to very low densities.

Likewise, the weight percentage of primary blowing agent in the composition is also important. Too much of the primary blowing agent results in a composition which does not rapidly expand in steam. If the level of primary blowing agent is too low, the foam may collapse, may fail to recover its volume after expansion, or may have too low a heat distortion temperature. The preferred concentration of total blowing agent to alkenyl aromatic polymer is from about 10 to about 30 parts per hundred parts by weight of polymer.

It has been found that the optional addition of about 0.01 to about 2.0 parts per hundred of an azido functional silane as a crosslinking agent to the overall composition further improves the steam expandability of the composition of the present invention. Suitable azido functional silane compounds include the group of azido trialkoxysilanes such as 2-(trimethoxysilyl)ethyl phenyl sulfonyl azide (commercially available from Petrarch Systems, Inc., Bristol, Pa.) and (triethoxysilyl)hexyl sulfonyl azide (commercially available as Azcup D-98 from Hercules, Inc., Wilmington, Del.).

The expandable composition of the present invention may be used to produce very low density material by means of either on-line or off-line expansion techniques. A very low density moldable material may be produced by impregnating the volatile mixed blowing agent of the present invention into a granular alkenyl aromatic polymer composition having a glass transition temperature between about 60° to about 100° C. The polymer impregnated with blowing agent is activated by heating causing the composition to expand. Typically, the expansion produces foam beads having a density of about 2-3 pounds per cubic foot (pcf) (32.0-48.1 Kg/m$^3$). After aging, preferably for a period of from about 1 to about 7 days, the foam beads are exposed to steam at substantially atmospheric pressure for a period of from several seconds to two hours, and preferably about 5 to about 15 minutes. Both single and multiple steam expansions are contemplated. This causes further expansion of the beads to densities as low as 0.2 pcf (3.2 Kg/m$^3$). The very low density foam beads may then be molded in accordance with known techniques.

An alternative method in accordance with the present invention is to produce a low density extruded foam by exposing the foam to steam after the foam leaves the extruder. This exposure to steam may take place after the extruded foam has been aged for a period of time or may take place immediately after the foam has left the die of an extruder.

FIG. 1 illustrates, in a schematic diagram, such an on-line steam expansion technique. The mixed volatile blowing agent of the present invention is melt processed under pressure with an alkenyl aromatic polymer having a glass transition temperature between about 60° to about 100° C. to form a flowable admixture or polymer gel 10. Polymer gel 10 then exits extruder 12 through die 14 to zone of lower pressure. In this instance, the zone of lower pressure is a steam chamber 20 having an inlet 22 for the addition of steam to the chamber at substantially atmospheric pressure. Steam enters the chamber through a porous distributor 23.

Steam chamber 20 has walls 24, 25 which may be of any suitable material including metal, Plexiglass ®, or a polymer resin such as a polycarbonate. Outer wall 25 acts as a shield for inner wall 24. The end of steam chamber 20 is sealed with a flexible rubber seal 28. As the polymer gel 10 exits die 14 it initially expands to a cellular structure having a density typically between 2 to 3 pcf (32.0 to 48.1 Kg/m$^3$). Exposure of the foam to atmospheric steam in steam chamber 20 for a time causes further expansion to lower densities. A pair of driven rolls 30, 32 pull the cellular foam out of the steam chamber.

Preferably, the steam chamber is designed to provide sufficient residence time for the steam to act on and expand the extruded foam. Typically, such residence time will be a period of from several seconds to several minutes. Accordingly, it can be seen that rapid expansion in steam is quite important in such an on-line technique. The mixed blowing agent of the present invention provides that rapid expansion capability.

The very low density foams produced by the above on- and off-line methods has several benefits including low final product cost because of the very low density product which is produced and increased flexibility of the foam structure because of the thinness of the cell walls. The foams produced may find use as insulation and cushion packaging.

The specific working examples that follow are intended to illustrate the invention but are not to be taken as limiting the scope thereof. In the examples, parts and percentages are by weight unless otherwise specified or required by the context.

EXAMPLE I

The apparatus used in this and other examples was a 1¼" screw type extruder having two additional zones for mixing and cooling at the end of usual sequential zones for feeding, melting, and metering. An opening for blowing agent injection was provided on the extruder barrel between the metering and mixing zones. A small styringe-type pump was connected to the blowing agent stream for optional injection of crosslinking agent. At the end of the cooling zone there was attached a die orifice having an opening of rectangular shape. The height of the opening, called die gap hereinafter, was adjustable while its width was fixed at 0.25 inches (6.35 millimeters).

A granular polystyrene with a weight average molecular weight of about 200,000 and a glass transition temperature of less than 100° C., was uniformly mixed with a small amount of dibutyl tin dilaurate condensation catalyst (T-12, available from M & T Chemicals, Inc.), barium stearate and talcum powder. The mixture was fed into the extruder at an essentially uniform rate of about 10 pounds per hour. A premixed blowing agent was injected into the extruder at a predetermined rate. Blowing agents used in this example were a 70/30 by weight mixture of dichlorodifluoromethane (FC-12) and trichloromonofluoromethane (FC-11) for the other tests. An azido functional silane, 2-(trimethoxysilyethylphenylsulfonyl)azide (C-T2905 distributed by Petrarch Systems, Inc.), was injected to the blowing agent stream at a uniform predetermined rate. The extruder zones were maintained at 170°, 190° and 200° C. for feeding, melting, metering, and mixing zone, respectively. The temperature of the cooling zone was adjusted so that the gel could be cooled down to a uniform temperature for optimum foam expansion.

At a fixed die opening for a given blowing agent system where all formulations provided good quality foams, both pressures at the die and extruder discharge were recorded and samples were taken. The foam samples were aged for about one month at ambient temperature prior to property determination and secondary foaming tests.

Secondary foaming was conducted both by atmospheric steam and by hot air (not an example of the present invention). Foam slugs of about 0.25 inch (6.35 millimeters) thickness were sliced out of foam strands and aged for about one day at ambient temperature prior to secondary expansions. After exposure to atmospheric steam for varying lengths of time, foam specimens were aged at ambient temperature while their weights and volumes were monitored. Highly expanded foam specimens shrank when taken out of steam but recovered to the final steady state volumes in about two days. Expansion tests in hot air were conducted similarly with the exception that expansion or shrinkage of a foam specimen in the oven was permanent, not needing ambient aging for volume recovery.

Tables IA and IB show the good results utilizing of the mixed FC-12/FC-11 blowing agent of the present invention. The tables also show that incorporation of an azido functional silane gradually raises both the die pressure and the extruder discharge pressure. Other noticable effects of silane include enlargement in cell size and cross sectional size which are desirable in foam extrusion.

Figure 2:
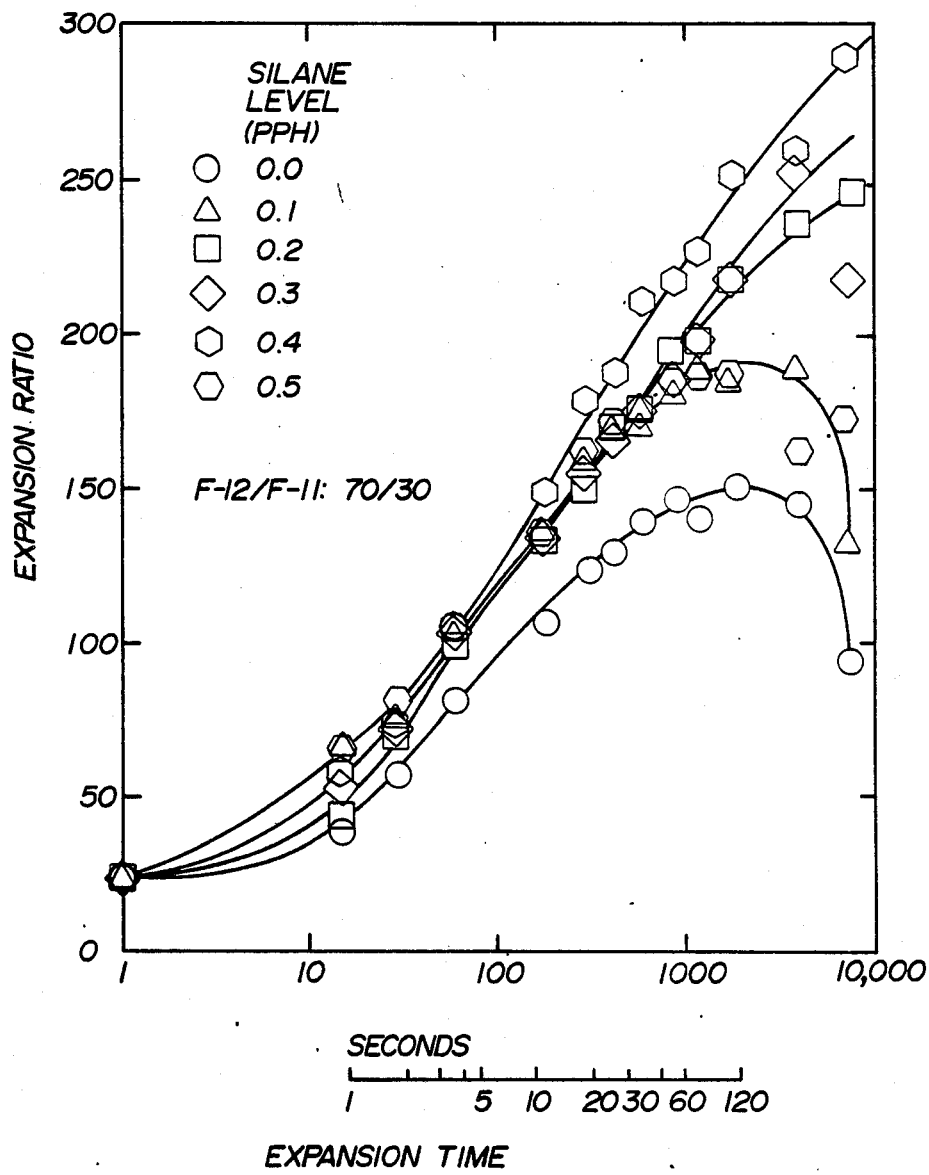
FIG. 2 is a graph comparing the expansion ratio versus expansion time for polystyrene foams having different blowing agents and/or levels of silane crosslinking agent based on data set forth in Example I.

The remarkable effects of the mixed blowing agent of the present invention and silane crosslinking agent on steam expandability of extruded polystyrene foam is seen in Table IB and the graph of FIG. 2, which represents the data reported in Table IB. The optional addition of silane enhances both the rate and extent of foam expansion in steam. At a silane level of 0.2 pph, the foam expands about twice as much as Test No. 1 to an expansion ratio exceeding 280 in two hours. At this long exposure to steam, Tests No. 1 and 2, one with a low level (0.05 pph) of silane, suffered thermal collapse; the expansion ratios are lower than those at one hour exposure.

The type of blowing agent has a significant effect on steam expandability of the extruded polystyrene foams. The FC-12/FC-11 mixed blowing agent of the present invention showed good expansion ratios. FC-11, having a high solubility in polystyrene, effectively plasticizes polystyrene for faster and greater expansion.

The effect of crosslinking is also seen in hot air expansion tests. As Table IC shows, foams lightly crosslinked with an azido functional silane expand more and withstand hot air longer than the control. For example, a foam crosslinked with 0.15 pph or higher level of azido silane keeps expanding during 90 minutes exposure to 100° C. air while the control collapses within 60 minutes at the same temperature. Although less pronounced, the crosslinking effect persists at a lower level of silane as well.

EXAMPLE II

The apparatus and its operating procedure used for tests in this example are the same as in Example 1. The polymer feedstock employed for tests in this example was a 50/50 by weight blend of polystyrene with Mw 200,000 and polystyrene with Mw 300,000. The mixture of polystyrenes had a glass transition temperature of less than 100° C. Approximately 0.05 pph T-12, 0.1 pph barium stearate and 0.1 pph talcum powder were mixed in the granular blend of two polystyrenes and fed into the extruder at a uniform rate of 10 pounds per hour.

TABLE IA

| Test No. | Blowing Agent Type (1) | Ratio (2) | Level (3) | BaSt Level (4) | Talc Level (5) | T-12 Level (6) | Azido Silane Level (7) | Foaming Gel Temp. (8) | Die Gap (9) | Die Press. (10) | Extruder Press. (11) | Foam Thick. (12) | Foam Width (13) | Foam Density (14) | Cell Size (15) |
|---|---|---|---|---|---|---|---|---|---|---|---|---|---|---|---|
| 1 | FC-12/FC-11 | 70/30 | 15.4 | 0.05 | 0.1 | 0.025 | — | 135 | 0.914 | 46.4 | 77.3 | 17.0 | 25.7 | 34.0 | 0.16 |
| 2 | FC-12/FC-11 | 70/30 | 15.4 | 0.05 | 0.1 | 0.025 | 0.05 | 134.5 | 0.914 | 39.7 | 70.3 | 16.5 | 27.2 | 33.0 | 0.27 |
| 3 | FC-12/FC-11 | 70/30 | 15.4 | 0.05 | 0.1 | 0.025 | 0.1 | 134 | 0.914 | 45.0 | 78.0 | 22.4 | 30.5 | 35.2 | 0.22 |
| 4 | FC-12/FC-11 | 70/30 | 15.4 | 0.05 | 0.1 | 0.025 | 0.15 | 134 | 0.914 | 46.4 | 80.9 | 22.9 | 32.5 | 35.9 | 0.27 |
| 5 | FC-12/FC-11 | 70/30 | 15.4 | 0.05 | 0.1 | 0.025 | 0.2 | 134 | 0.914 | 48.5 | 84.4 | 18.5 | 32.8 | 36.0 | 0.27 |
| 6 | FC-12/FC-11 | 70/30 | 15.4 | 0.05 | 0.1 | 0.025 | 0.25 | 134 | 0.914 | 51.3 | 91.4 | 24.9 | 36.3 | 36.5 | 0.21 |

(1) = FC-12 = dichlorodifluoromethane, FC-11 = trichloromonofluoromethane
(2) = mixture ratio by weight of the component blowing agents
(3) = parts of blowing agent mixed in per hundred parts of polymer
(4) = parts of barium stearate mixed in per hundred parts of polymer
(5) = parts of talcum powder mixed in per hundred parts of polymer
(6) = parts of dibutyl tin dilaurate mixed in per hundred parts of polymer
(7) = parts of azido functional silane mixed in per hundred parts of polymer
(8) = temperature of foaming gel in degrees centigrade
(9) = the gap of die opening in millimeters
(10) = the pressure in kilograms per square centimeter at the die
(11) = the pressure in kilograms per square centimeter at the extruder discharge
(12) = thickness of foam body in millimeters determined after aging for about a month
(13) = width of foam body in millimeters determined after aging for about a month
(14) = density of foam body in kilograms per square meter determined after aging for about a month
(15) = cell size in millimeter in horizontal direction determined per ASTM D-3576

TABLE IB

| Test No. | Blowing Agent Type (1) | Ratio (2) | Level (3) | Azido Silane Level (4) | Initial Expansion Ratio (5) | 15 sec. | 30 sec. | 1 min. | 3 min. | 5 min. | 7 min. | 10 min. | 15 min. | 20 min. | 30 min. | 1 hr. | 2 hrs. |
|---|---|---|---|---|---|---|---|---|---|---|---|---|---|---|---|---|---|
| 1 | FC-12/FC-11 | 70/30 | 15.4 | — | 24.6 | 39.0 | 57.6 | 81.2 | 107 | 124 | 129 | 140 | 147 | 140 | 151 | 145 | 94 |
| 2 | FC-12/FC-11 | 70/30 | 15.4 | 0.05 | 22.5 | 66.6 | 76.3 | 105 | 136 | 159 | 170 | 170 | 181 | 189 | 185 | 190 | 132 |
| 3 | FC-12/FC-11 | 70/30 | 15.4 | 0.1 | 24.0 | 44.2 | 66.0 | 98.6 | 137 | 150 | 166 | 175 | 193 | 198 | 218 | 237 | 246 |
| 4 | FC-12/FC-11 | 70/30 | 15.4 | 0.15 | 23.7 | 51.7 | 69.7 | 102 | 138 | 154 | 168 | 175 | 187 | 197 | 218 | 252 | 218 |
| 5 | FC-12/FC-11 | 70/30 | 15.4 | 0.2 | 25.9 | 57.3 | 71.0 | 108 | 149 | 179 | 187 | 212 | 217 | 227 | 251 | 266 | 288 |
| 6 | FC-12/FC-11 | 70/30 | 15.4 | 0.25 | 23.4 | 63.8 | 82.1 | 109 | 136 | 162 | 173 | 155 | 183 | 186 | 186 | 161 | 172 |

(1) = FC-12 = dichlorodifluoromethane, FC-11 = trichloromonofluoromethane
(2) = mixture ratio by weight of the component blowing agents
(3) = parts of blowing agent mixed in per hundred parts of polymer
(4) = parts of azido functional silane mixed in per hundred parts of polymer
(5) = specific volume of foam body aged for about a month divided by specific volume of the polymer determined prior to steam expansion tests
(6) = expansion ratio of foam body determined in about two days after expansion in steam for given period of time

TABLE IC

| Test No. | Blowing Agent Type (1) | Ratio (2) | Level (3) | Azido Silane Level (4) | Initial Expansion Ratio (5) | Expansion Ratio after Expanding in Hot Air at 100° C. for (min.) (6) | | | | | | |
|---|---|---|---|---|---|---|---|---|---|---|---|---|
| | | | | | | 3 | 5 | 10 | 15 | 30 | 45 | 60 | 90 |
| 1 | FC-12/FC-11 | 70/30 | 15.4 | — | 24.6 | 29.2 | 47.8 | 68.3 | 59.5 | 68.8 | 54.8 | 12.8 | 14.0 |
| 2 | FC-12/FC-11 | 70/30 | 15.4 | 0.05 | 22.5 | 27.6 | 28.4 | 68.3 | 57.2 | 75.8 | 79.8 | 36.2 | 31.5 |
| 3 | FC-12/FC-11 | 70/30 | 15.4 | 0.1 | 24.0 | 26.7 | 41.1 | 56.3 | 56.3 | 78.3 | 87.2 | 39.9 | 51.5 |
| 4 | FC-12/FC-11 | 70/30 | 15.4 | 0.15 | 23.7 | 26.7 | 36.3 | 49.6 | 66.2 | 75.6 | 86.1 | 50.4 | 85.1 |
| 5 | FC-12/FC-11 | 70/30 | 15.4 | 0.2 | 25.9 | 26.7 | 43.0 | 53.4 | 64.0 | 71.8 | 84.0 | 97.4 | 120.3 |
| 6 | FC-12/FC-11 | 70/30 | 15.4 | 0.25 | 23.4 | 28.6 | 50.6 | 55.7 | 58.2 | 74.6 | 88.2 | 95.5 | 106.0 |

| Test No. | Blowing Agent Type (1) | Ratio (2) | Level (3) | Azido Silane Level (4) | Initial Expansion Ratio (5) | Expansion Ratio after Expanding in Hot Air at 115° C. for (min.) (7) | | | | | | |
|---|---|---|---|---|---|---|---|---|---|---|---|---|
| | | | | | | 3 | 5 | 10 | 15 | 30 | 45 | 60 | 90 |
| 1 | FC-12/FC-11 | 70/30 | 15.4 | — | 24.6 | 29.2 | 39.4 | 57.2 | 65.6 | 30.2 | 9.6 | 7.9 | 7.4 |
| 2 | FC-12/FC-11 | 70/30 | 15.4 | 0.05 | 22.5 | 35.0 | 38.5 | 61.8 | 57.8 | 48.3 | 11.6 | 8.4 | 6.4 |
| 3 | FC-12/FC-11 | 70/30 | 15.4 | 0.1 | 24.0 | 27.3 | 47.7 | 66.2 | 51.6 | 77.7 | 16.2 | 11.6 | 8.4 |
| 4 | FC-12/FC-11 | 70/30 | 15.4 | 0.15 | 23.7 | 27.3 | 44.1 | 58.2 | 63.0 | 72.6 | 13.7 | 10.1 | 7.6 |
| 5 | FC-12/FC-11 | 70/30 | 15.4 | 0.2 | 25.9 | 38.2 | 42.0 | 61.3 | 63.0 | 91.4 | 25.8 | 14.3 | 11.5 |

TABLE IC-continued

| | | | | | | | | | | | |
|---|---|---|---|---|---|---|---|---|---|---|---|
| 6 | FC-12/FC-11 | 70/30 | 15.4 | 0.25 | 23.4 | 25.8 | 40.1 | 66.2 | 59.2 | 83.0 | 48.3 | 16.8 | 11.6 |

(1) = FC-12 = dichlorodifluoromethane, FC-11 = trichloromonofluoromethane
(2) = mixture ratio by weight of the component blowing agents
(3) = parts of blowing agent mixed in per hundred parts of polymer
(4) = parts of azido functional silane mixed in per hundred parts of polymer
(5) = specific volume of foam body aged for about a month divided by specific volume of the polymer determined prior to steam expansion tests
(6) = expansion ratio of foam body after expanding in hot air of 110° C. for specified period
(7) = expansion ratio of foam body after expanding in hot air of 115° C. for specified period In the tests a 70/30 mixture of FC-12 and FC-11 was used as the blowing agent. The level of azido silane crosslinking agent was varied up to 0.45 pph. The extruder zones were maintained at about 170°, 200° and 200° C. for feeding, melting, metering, and mixing zone, respectively. The temperature of the cooling zone was adjusted so that the gel could reach an essentially uniform temperature of about 135° C.

When the operating condition reached an essentially steady state, the effects of die opening on foam appearance and line pressure were studied. Foam samples were taken both at the threshold die gap for prefoaming and at a fixed die gap for a given blowing agent system. Property determination and secondary foaming tests were conducted as described in Example I.

In general, the use of the mixed blowing agent of the present invention and silane crosslinking have similar effects on this polymer blend. As shown in Tables IIA, IIB and IIC, azido functional silane increased die pressure and cell size permitting achievement of a larger foam cross section and greater expansion in both steam and hot air. The die may be opened wider at an azido functional silane level 0.25 pph or higher. For this polymer blend also, the type of expanding agent has a pronounced effect on steam expandability. The FC-12/FC-11 mixed blowing agent of the present invention provided good expansion results. This is ascribed to the low permeability and high solubility of FC-11 in polystyrene.

TABLE IIA

| Test No. | Blowing Agent Type (1) | Ratio (2) | Level (3) | Azido Silane Level (4) | Foaming Gel Temp. (5) | Threshold for Prefoaming Die Gap (6) | Die Press. (7) | Foam Thick. (8) | Foam Width (9) |
|---|---|---|---|---|---|---|---|---|---|
| 1 | FC-12/FC-11 | 70/30 | 15.4 | — | 135 | 1.803 | 43.2 | 15.7 | 29.7 |
| 2 | FC-12/FC-11 | 70/30 | 15.4 | 0.05 | 135 | 2.032 | 42.5 | 17.8 | 30.5 |
| 3 | FC-12/FC-11 | 70/30 | 15.4 | 0.1 | 135 | 2.032 | 44.3 | 17.3 | 32.3 |
| 4 | FC-12/FC-11 | 70/30 | 15.4 | 0.15 | 135 | 2.032 | 45.7 | 20.0 | 34.0 |
| 5 | FC-12/FC-11 | 70/30 | 15.4 | 0.2 | 135 | 2.032 | 47.1 | 20.0 | 33.3 |
| 6 | FC-12/FC-11 | 70/30 | 15.4 | 0.25 | 135 | 2.261 | 42.9 | 20.3 | 33.0 |
| 7 | FC-12/FC-11 | 70/30 | 15.4 | 0.35 | 135 | 2.489 | 41.5 | 28.2 | 38.6 |
| 8 | FC-12/FC-11 | 70/30 | 15.4 | 0.45 | 135 | 2.489 | 41.5 | 24.6 | 33.5 |

| Test No. | Sampling Die Gap (10) | Die Press. (11) | Extruder Press. (12) | Foam Thick. (13) | Foam Width (14) | Foam Density (15) | Cell Size (16) |
|---|---|---|---|---|---|---|---|
| 1 | 1.803 | 43.2 | 84.4 | 15.7 | 29.7 | 33.6 | 0.30 |
|   | 2.032 | 35.9 | 78.0 | 16.5 | 27.4 | 36.7 | — |
| 2 | 2.032 | 42.5 | 91.4 | 17.8 | 30.5 | 37.5 | 0.31 |
| 3 | 2.032 | 44.3 | 94.2 | 17.3 | 32.3 | 38.1 | 0.35 |
| 4 | 2.032 | 45.7 | 94.9 | 20.0 | 34.0 | 37.6 | 0.38 |
| 5 | 2.032 | 47.1 | 96.3 | 20.0 | 33.3 | 37.5 | 0.43 |
| 6 | 2.032 | 49.6 | 94.9 | 20.8 | 34.3 | 35.2 | 0.42 |
| 7 | 2.032 | 54.1 | 101.9 | 26.2 | 36.6 | 35.9 | 0.56 |
| 8 | 2.032 | 57.0 | 103.7 | 22.4 | 35.3 | 33.0 | 0.42 |

(1) = FC-12 = dichlorodifluoromethane, FC-11 = trichloromonofluoromethane
(2) = mixture ratio by weight of the component blowing agents
(3) = parts of blowing agent mixed in per hundred parts of polymer
(4) = parts of azido functional silane mixed in per hundred parts of polymer
(5) = temperature of foaming gel in degrees centigrade
(6) = the gap of die opening in millimeters at the threshold of prefoaming
(7) = pressure at the die in kilograms per square centimeter at the threshold of prefoaming
(8) = thickness of foam body in millimeters at the threshold of prefoaming
(9) = width of foam body in millimeters at the threshold of prefoaming
(10) = the gap of die opening in millimeters where the foam sample was taken
(11) = pressure at the die in kilogram per square centimeter at the sampling die opening
(12) = pressure at the extruder discharge in kilograms per square centimeter at the sampling die opening
(13) = thickness of foam body in millimeters determined after aging for about a month
(14) = width of foam body in millimeters determined after aging for about a month
(15) = density of foam body in kilograms per square meter determined after aging for about a month
(16) = cell size in millimeter in horizontal direction determined per ASTM D-3576.

TABLE IIB

| Test No. | Blowing Agent Type (1) | Ratio (2) | Level (3) | Azido Silane Level (4) | Initial Expansion Ratio (5) | (6) Expansion Ratio after Expanding In Steam for | | | | | | | | | | | | |
|---|---|---|---|---|---|---|---|---|---|---|---|---|---|---|---|---|---|---|
| | | | | | | 15 sec. | 30 sec. | 1 min. | 3 min. | 5 min. | 7 min. | 10 min. | 12 min. | 15 min. | 20 min. | 30 min. | 45 min. | 1 hr. | 2 hrs. |
| 1 | FC-12/FC-11 | 70/30 | 15.4 | — | 25.7 | 35.7 | 63.2 | 80.8 | 99.1 | 105 | 108 | 114 | 113 | 117 | 126 | 127 | 130 | 116 | 103 |

TABLE IIB-continued

| Test No. | Blowing Agent Type (1) | Ratio (2) | Level (3) | Azido Silane Level (4) | Initial Expansion Ratio (5) | Expansion Ratio after Expanding In Steam for (6) |  |  |  |  |  |  |  |  |  |  |  |  |
|---|---|---|---|---|---|---|---|---|---|---|---|---|---|---|---|---|---|---|---|
|  |  |  |  |  |  | 15 sec. | 30 sec. | 1 min. | 3 min. | 5 min. | 7 min. | 10 min. | 12 min. | 15 min. | 20 min. | 30 min. | 45 min. | 1 hr. | 2 hrs. |
| 2 | FC-12/FC-11 | 70/30 | 15.4 | 0.05 | 24.6 | 33.2 | 60.2 | 81.4 | 101 | 110 | 109 | 121 | 112 | 129 | 136 | 138 | 157 | 143 | 119 |
| 3 | FC-12/FC-11 | 70/30 | 15.4 | 0.1 | 24.4 | 34.3 | 62.0 | 82.0 | 105 | 113 | 119 | 119 | 126 | 133 | 130 | 139 | 124 | 131 | 117 |
| 4 | FC-12/FC-11 | 70/30 | 15.4 | 0.15 | 24.6 | 30.7 | 63.8 | 86.2 | 114 | 127 | 131 | 142 | 141 | 145 | 160 | 166 | 159 | 168 | 150 |
| 5 | FC-12/FC-11 | 70/30 | 15.4 | 0.2 | 25.4 | 37.1 | 71.1 | 92.9 | 120 | 135 | 134 | 154 | 157 | 169 | 175 | 176 | 160 | 170 | 176 |
| 6 | FC-12/FC-11 | 70/30 | 15.4 | 0.25 | 26.7 | 38.9 | 66.5 | 95.8 | 128 | 143 | 152 | 157 | 167 | 198 | 187 | 190 | 202 | 190 | 169 |
| 7 | FC-12/FC-11 | 70/30 | 15.4 | 0.35 | 26.4 | 41.3 | 76.4 | 103 | 144 | 164 | 178 | 201 | 202 | 202 | 203 | 220 | 185 | 165 | 170 |
| 8 | FC-12/FC-11 | 70/30 | 15.4 | 0.45 | 27.7 | 41.3 | 81.7 | 99.2 | 129 | 143 | 160 | 177 | 179 | 173 | 176 | 187 | 199 | 176 | 167 |

(1) = FC-12 = dichlorodifluoromethane, FC-11 = trichloromonofluoromethane
(2) = mixture ratio by weight of the component blowing agents
(3) = parts of blowing agent mixed in per hundred parts of polymer
(4) = parts of azido functional silane mixed in per hundred parts of polymer
(5) = specific volume of foam body aged for about a month divided by specific volume of the polymer determined prior to steam expansion tests
(6) = expansion ratio of foam body determined in about two days after expansion in steam for given period of time

TABLE IIC

| Test No. | Blowing Agent Type (1) | Ratio (2) | Level (3) | Azido Silane Level (4) | Initial Expansion Ratio (5) | Expansion Ratio after Expanding in Hot Air at 115° C. for (min.) (6) |  |  |  |  |  |  |  |
|---|---|---|---|---|---|---|---|---|---|---|---|---|---|
|  |  |  |  |  |  | 3 | 5 | 10 | 15 | 30 | 45 | 60 | 90 |
| 1 | FC-12/FC-11 | 70/30 | 15.4 | — | 29.0 | 56.6 | 61.9 | 55.7 | 38.2 | 18.1 | 8.6 | 7.0 | 6.4 |
| 2 | FC-12/FC-11 | 70/30 | 15.4 | 0.05 | 26.9 | 54.2 | 57.1 | 59.2 | 56.5 | 29.0 | 16.4 | 10.6 | 8.4 |
| 3 | FC-12/FC-11 | 70/30 | 15.4 | 0.1 | 26.3 | 53.7 | 54.1 | 62.2 | 57.6 | 44.0 | 17.7 | 15.6 | 10.0 |
| 4 | FC-12/FC-11 | 70/30 | 15.4 | 0.15 | 26.5 | 54.7 | 54.4 | 61.8 | 58.9 | 56.8 | 51.5 | 17.9 | 13.2 |
| 5 | FC-12/FC-11 | 70/30 | 15.4 | 0.2 | 27.6 | 58.0 | 57.5 | 61.7 | 65.2 | 69.2 | 49.8 | 14.6 | 13.8 |
| 6 | FC-12/FC-11 | 70/30 | 15.4 | 0.25 | 28.6 | 59.2 | 61.3 | 59.8 | 65.0 | 72.7 | 70.3 | 26.3 | 15.3 |
| 7 | FC-12/FC-11 | 70/30 | 15.4 | 0.35 | 28.2 | 56.1 | 58.3 | 57.3 | 65.3 | 69.9 | 72.4 | 77.1 | 42.1 |
| 8 | FC-12/FC-11 | 70/30 | 15.4 | 0.45 | 29.8 | 56.2 | 65.8 | 60.1 | 71.2 | 70.5 | 66.5 | 33.7 | 16.6 |

(1) = FC-12 = dichlorodifluoromethane, FC-11 = trichloromonofluoromethane
(2) = mixture ratio by weight of the component blowing agents
(3) = parts of blowing agent mixed in per hundred parts of polymer
(4) = parts of azido functional silane mixed in per hundred parts of polymer
(5) = specific volume of foam body aged for about a month divided by specific volume of the polymer determined prior to steam expansion tests
(6) = expansion ratio of foam body after expanding in hot air of 115° C. for specified period

EXAMPLE III

The apparatus, polymer composition, additives, temperature of extruder zones and operating procedure are the same as in Example II. A 70/30 by weight mixture of FC-12 and isopropyl alcohol was used as the blowing agent.

The process data set forth in Table IIIA manifest the crosslinking-delaying effect of alcohol in the foam extrusion line. The line pressures hardly rise at a silane level as much as 0.20 pph which has resulted in a significant rise in line pressures with FC-12/FC-11 blowing agent (Table IIIA). Only a moderate rise in the line pressures is seen at a higher silane level. With this blowing agent also, the general effects of azido silane on foam extrusion and secondly expansions may be seen.

A close comparison of secondary expansion characteristics between foams expanded with FC-12/FC-11 blowing agent and those expanded with FC-12/i-PrOH blowing agent reveals an interesting tendency. The foams made with FC-12/i-PrOH blowing agent expand faster in steam than those made with FC-12/FC-11 blowing agent but slower than the latter in hot air. It is inferred that isopropyl alcohol not only plasticizes polystyrene but increases the permeation rate of water through the polymer by raising the solubility of water in the polymer/blowing agent phase. For this polymer blend also, the type of expanding agent has a pronounced effect on the steam expandability. The FC-12/i-PrOH mixed blowing agent of the present invention provided very good expansion results.

TABLE IIIA

| Test No. | Blowing Agent Type (1) | Ratio (2) | Level (3) | Azido Silane Level (4) | Foaming Gel Temp. (5) | Threshold for Prefoaming |  |  |  |
|---|---|---|---|---|---|---|---|---|---|
|  |  |  |  |  |  | Die Gap (6) | Die Press. (7) | Foam Thick. (8) | Foam Width (9) |
| 1 | FC-12/i-PrOH | 70/30 | 15.0 | — | 134 | 1.803 | 34.5 | 16.5 | 28.2 |
| 2 | FC-12/i-PrOH | 70/30 | 15.0 | 0.05 | 134 | 1.803 | 34.1 | 18.8 | 27.9 |
| 3 | FC-12/i-PrOH | 70/30 | 15.0 | 0.1 | 134 | 1.803 | 34.1 | 19.6 | 32.3 |
| 4 | FC-12/i-PrOH | 70/30 | 15.0 | 0.15 | 134 | 1.803 | 33.0 | 19.3 | 28.4 |
| 5 | FC-12/i-PrOH | 70/30 | 15.0 | 0.20 | 134 | 1.803 | 32.7 | 20.0 | 29.7 |

TABLE IIIA-continued

| | | | | | | | | | |
|---|---|---|---|---|---|---|---|---|---|
| 6 | FC-12/i-PrOH | 70/30 | 15.1 | 0.25 | 135 | 1.803 | 35.9 | 20.3 | 29.7 |
| 7 | FC-12/i-PrOH | 70/30 | 15.1 | 0.35 | 135 | 2.032 | 29.2 | 24.4 | 33.5 |
| 8 | FC-12/i-PrOH | 70/30 | 15.1 | 0.45 | 135 | 2.286 | 31.3 | 24.6 | 36.3 |

| Test No. | Sampling Die Gap (10) | Die Press. (11) | Extruder Press. (12) | Foam Thick. (13) | Foam Width (14) | Foam Density (15) | Cell Size (16) |
|---|---|---|---|---|---|---|---|
| 1 | 1.803 | 34.5 | 64.0 | 16.5 | 28.2 | 34.0 | 0.37 |
| 2 | 1.803 | 34.1 | 66.8 | 18.8 | 27.9 | 30.0 | 0.39 |
| 3 | 1.803 | 34.1 | 66.8 | 19.6 | 32.3 | 30.4 | 0.37 |
| 4 | 1.803 | 33.0 | 66.8 | 19.3 | 28.4 | 29.6 | 0.49 |
| 5 | 1.803 | 32.7 | 65.4 | 20.0 | 29.7 | 28.2 | 0.46 |
| 6 | 1.803 | 35.9 | 73.2 | 20.3 | 33.8 | 31.9 | 0.65 |
| 7 | 1.803 | 29.2 | 70.3 | 22.6 | 28.7 | 30.4 | 0.74 |
| 8 | 1.803 | 39.7 | 73.8 | 21.6 | 36.8 | 31.2 | 0.52 |

(1) = FC-12 = dichlorodifluoromethane, i-PrOH = isopropyl alcohol
(2) = mixture ratio by weight of the component blowing agents
(3) = parts of blowing agent mixed in per hundred parts of polymer
(4) = parts of azido functional silane mixed in per hundred parts of polymer
(5) = temperature of foaming gel in degrees centigrade
(6) = the gap of die opening in millimeters at the threshold of prefoaming
(7) = pressure at the die in kilograms per square centimeter at the threshold of prefoaming
(8) = thickness of foam body in millimeters at the threshold of prefoaming
(9) = width of foam body in millimeters at the threshold of prefoaming
(10) = the gap of die opening in millimeters where the foam sample was taken
(11) = pressure at the die in kilograms per square centimeter at the sampling die opening
(12) = pressure at the extruder discharge in kilograms per square centimeter at the sampling die opening
(13) = thickness of foam body in millimeters determined after aging for about a month
(14) = width of foam body in millimeters determined after aging for about a month
(15) = density of foam body in kilograms per square meter determined after aging for about a month
(16) = cell size in millimeter in horizontal direction determined per ASTM D-3576.

TABLE IIIB

| Test No. | Blowing Agent Type (1) | Ratio (2) | Level (3) | Azido Silane Level (4) | Initial Expansion Ratio (5) | Expansion Ratio after Expanding In Steam for | | | | |
|---|---|---|---|---|---|---|---|---|---|---|
| | | | | | | 15 sec. | 30 sec. | 1 min. | 3 min. | 5 min. |
| 1 | FC-12/i-PrOH | 70/30 | 15.0 | — | 30.1 | 46.5 | 81.9 | 98.6 | 121 | 134 |
| 2 | FC-12/i-PrOH | 70/30 | 15.0 | 0.05 | 30.6 | 51.1 | 80.8 | 102 | 129 | 137 |
| 3 | FC-12/i-PrOH | 70/30 | 15.0 | 0.1 | 29.0 | 50.8 | 78.8 | 102 | 123 | 133 |
| 4 | FC-12/i-PrOH | 70/30 | 15.0 | 0.15 | 31.5 | 58.2 | 91.4 | 106 | 133 | 148 |
| 5 | FC-12/i-PrOH | 70/30 | 15.1 | 0.2 | 32.1 | 51.6 | 91.7 | 103 | 138 | 150 |
| 6 | FC-12/i-PrOH | 70/30 | 15.1 | 0.25 | 29.7 | 51.0 | 92.0 | 121 | 154 | 179 |
| 7 | FC-12/i-PrOH | 70/30 | 15.1 | 0.35 | 31.1 | 56.0 | 96.7 | 117 | 166 | 149 |
| 8 | FC-12/i-PrOH | 70/30 | 15.1 | 0.45 | 31.3 | 61.2 | 99.4 | 126 | 174 | 195 |

| Test No. | Expansion Ratio after Expanding In Steam for | | | | | | | | |
|---|---|---|---|---|---|---|---|---|---|
| | 7 min. | 10 min. | 12 min. | 15 min. | 20 min. | 30 min. | 45 min. | 1 hr. | 2 hrs |
| 1 | 147 | 137 | 144 | 143 | 144 | 143 | 125 | 126 | 112 |
| 2 | 146 | 155 | 153 | 160 | 154 | 156 | 153 | 147 | 131 |
| 3 | 152 | 155 | 157 | 174 | 161 | 166 | 137 | 150 | 150 |
| 4 | 156 | 137 | 164 | 160 | 169 | 166 | 162 | 167 | 151 |
| 5 | 185 | 220 | 171 | 172 | 194 | 163 | 158 | 175 | 148 |
| 6 | 197 | 209 | 174 | 192 | 190 | 201 | 170 | 122 | 134 |
| 7 | 198 | 207 | 203 | 209 | 207 | 197 | 168 | 178 | 131 |
| 8 | 202 | 198 | 191 | 198 | 202 | 185 | 135 | 158 | 131 |

(1) = FC-12 = dichlorodifluoromethane, i-PrOH = isopropyl alcohol
(2) = mixture ratio by weight of the component blowing agents
(3) = parts of blowing agent mixed in per hundred parts of polymer
(4) = parts of azido functional silane mixed in per hundred parts of polymer
(5) = specific volume of foam body aged for about a month divided by specific volume of the polymer determined prior to steam expansion tests
(6) = expansion ratio of foam body determined in about two days after expansion in steam for given period of time

TABLE IIIC

| Test No. | Blowing Agent Type (1) | Ratio (2) | Level (3) | Azido Silane Level (4) | Initial Expansion Ratio (5) | Expansion Ratio after Expanding in Hot Air at 115° C. for (min.) (6) | | | | | | |
|---|---|---|---|---|---|---|---|---|---|---|---|---|
| | | | | | | 3 | 5 | 10 | 15 | 30 | 45 | 60 | 90 |
| 1 | FC-12/i-PrOH | 70/30 | 15.0 | — | 30.1 | 34.7 | 44.1 | 45.8 | 53.6 | 56.7 | 58.8 | 64.1 | 15.8 |
| 2 | FC-12/i-PrOH | 70/30 | 15.0 | 0.05 | 32.0 | 34.7 | 34.4 | 54.4 | 51.6 | 59.2 | 64.0 | 67.8 | 26.7 |
| 3 | FC-12/i-PrOH | 70/30 | 15.0 | 0.1 | 30.9 | 31.5 | 46.4 | 52.5 | 52.5 | 56.9 | 62.1 | 65.6 | 60.1 |
| 4 | FC-12/i-PrOH | 70/30 | 15.0 | 0.15 | 33.1 | 33.1 | 45.8 | 54.3 | 52.2 | 59.5 | 64.8 | 67.4 | 49.9 |
| 5 | FC-12/i-PrOH | 70/30 | 15.0 | 0.2 | 34.1 | 43.8 | 58.2 | 54.3 | 61.1 | 62.1 | 64.0 | 66.5 | 66.8 |

TABLE IIIC-continued

| Test No. | Blowing Agent Type (1) | Ratio (2) | Level (3) | Azido Silane Level (4) | Initial Expansion Ratio (5) | 3 | 5 | 10 | 15 | 30 | 45 | 60 | 90 |
|---|---|---|---|---|---|---|---|---|---|---|---|---|---|
| 6 | FC-12/i-PrOH | 70/30 | 15.1 | 0.25 | 29.6 | 35.7 | 47.9 | 47.3 | 51.5 | 51.2 | 52.5 | 57.4 | 74.2 |
| 7 | FC-12/i-PrOH | 70/30 | 15.1 | 0.35 | 30.3 | 30.2 | 48.2 | 50.5 | 50.0 | 51.9 | 56.4 | 59.9 | 74.1 |
| 8 | FC-12/i-PrOH | 70/30 | 15.1 | 0.45 | 31.0 | 34.0 | 39.7 | 55.8 | 64.5 | 65.8 | 65.8 | 65.0 | 81.9 |
| | | | | | Expansion Ratio after Expanding in Hot Air at 120° C. for (min.) (7) | | | | | | | | |
| 1 | FC-12/i-PrOH | 70/30 | 15.0 | — | 30.1 | 31.1 | 33.2 | 47.7 | 47.7 | 11.5 | 9.6 | 8.4 | 7.0 |
| 2 | FC-12/i-PrOH | 70/30 | 15.0 | 0.05 | 32.0 | 32.5 | 40.1 | 56.3 | 56.7 | 23.1 | 12.6 | 8.4 | 8.1 |
| 3 | FC-12/i-PrOH | 70/30 | 15.0 | 0.1 | 30.9 | 36.8 | 30.6 | 51.6 | 56.9 | 24.8 | 17.2 | 13.4 | 11.4 |
| 4 | FC-12/i-PrOH | 70/30 | 15.0 | 0.15 | 33.1 | 33.3 | 40.1 | 56.9 | 58.8 | 40.1 | 16.2 | 14.3 | 11.5 |
| 5 | FC-12/i-PrOH | 70/30 | 15.0 | 0.2 | 34.1 | 47.7 | 46.8 | 59.2 | 57.3 | 40.1 | 16.2 | 13.4 | 10.5 |
| 6 | FC-12/i-PrOH | 70/30 | 15.1 | 0.25 | 29.6 | 33.1 | 40.4 | 56.9 | 61.4 | 58.6 | 25.4 | 18.4 | 13.1 |
| 7 | FC-12/i-PrOH | 70/30 | 15.1 | 0.35 | 30.3 | 38.8 | 44.4 | 61.4 | 59.3 | 73.5 | 31.5 | 20.3 | 13.7 |
| 8 | FC-12/i-PrOH | 70/30 | 15.1 | 0.45 | 31.0 | 35.0 | 50.1 | 64.8 | 66.5 | 80.5 | 66.8 | 31.5 | 21.0 |

(1) = FC-12 = dichlorodifluoromethane, i-PrOH = isopropyl alcohol
(2) = mixture ratio by weight of the component blowing agents
(3) = parts of blowing agent mixed in per hundred parts of polymer
(4) = parts of azido functional silane mixed in per hundred parts of polymer
(5) = specific volume of foam body aged for about a month divided by specific volume of the polymer determined prior to steam expansion tests
(6) = expansion ratio of foam body after expanding in hot air of 115° C. for specified period
(7) = expansion ratio of foam body after expanding in hot air of 120° C. for specified period

EXAMPLE IV

The apparatus and procedures used in this example were essentially the same as those used in previous examples. A polystyrene with a molecular weight of 200,000 was used. A steam chamber such as that illustrated in FIG. 1 was attached to the outlet die of the extruder to determine the effect of on-line steam application on foam density. Three steam chambers of 0.5, 1.0, and 2.0 feet (15.2, 25.4, and 50.8 cm) in length were used to provide different residence times. The steam chambers consisted of a Lexan ® polycarbonate tube having a nominal 2.875 inches (7.3 cm) I.D. and a nominal 3.0 inches (7.6 cm) O.D., an outer shielding tube made of 0.25 inch (0.635 cm) thick, 4 inch (10.16 cm) O.D. Plexiglass ®, a steam injection assembly attached at the die face, and the end piece having a rubber seal. The steam injection assembly and the end piece were commonly used for all three tubes. Steam was generated by a small boiler and was flowed into the chamber through a Tegraglass ® porous distributor. The steam impinged on the surface of the expanding foam strand at the die, passed through the chamber, and was permitted to leak out through the clearance between the foam strand and rubber seal. The foam strand was conducted away at a uniform rate by a set of pull rolls.

The pull rate was adjusted to give a slight pull to the strand. Control samples were taken prior to steam tests with each chamber. The steam pressure at the boiler was maintained at about 20 psig (1.41 kg/cm$^2$). After steam was introduced, a few minutes were allowed for the system to equilibrate prior to taking samples.

Figure 3:
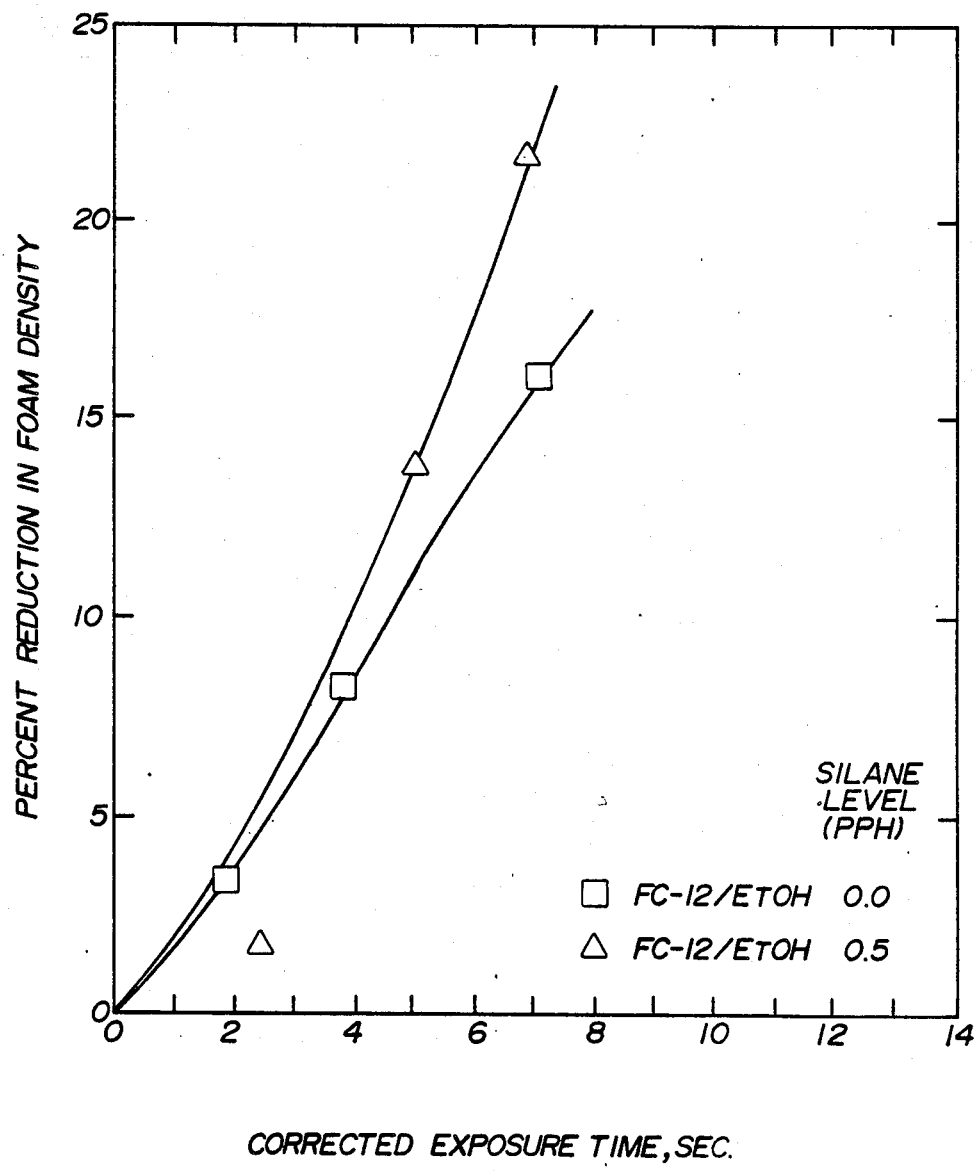
FIG. 3 is a graph comparing the reduction in foam density versus exposure time for the on-line steam expansion of a polystyrene foam with different blowing agents based on data set forth in Example IV.

FIG. 3 illustrates how different blowing agent formulations affect the steam expansion rates of foams extruded from a polystyrene having a weight average molecular weight of about 200,000. Since factors affecting the apparent expansion rate include foam dimensions, foam densities, and foaming temperature, corrections were made for these external factors so that intrinsic expansion rates would be properly compared. Corrections for dimensional variations were made according to the following equation:

$$T^* = \frac{T}{\text{width} \times \text{thickness}}$$

where T* is the corrected exposure time and T is the real exposure time. The normalized corrected exposure time (T*) is approximately equivalent to the exposure time for a cylindrical foam having a one inch diameter. No corrections were made for the variation of foam density since they were all within a narrow range of 1.9 to 2.3 pcf (30.4 to 36.8 Kg/m$^3$).

As can be seen from FIG. 3, the foams made with blowing agents within the scope of the present invention expanded rapidly. The addition of azido silane crosslinking agent further enhances the steam expansion rate. For this foam, density was reduced by 10% in 4 seconds and 20% in about 6 seconds of steam exposure.

Figure 4:
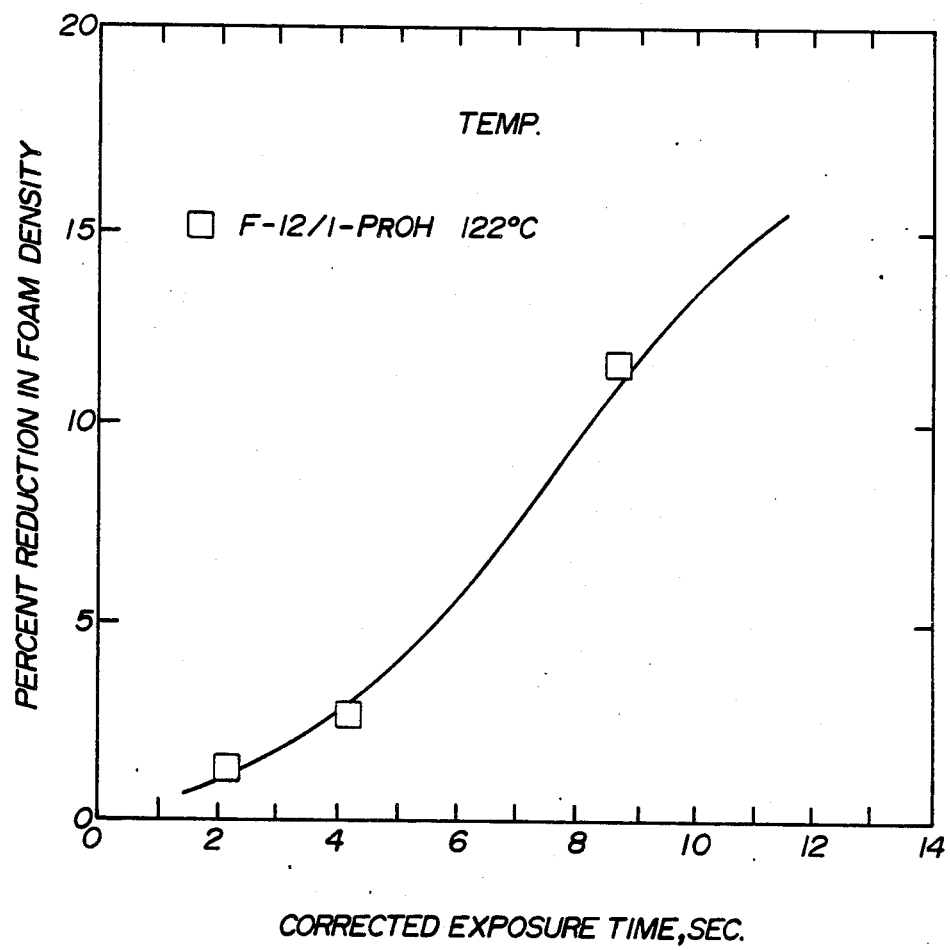
FIG. 4 is also a graph comparing the reduction in foam density versus exposure time for the on-line steam expansion of a polystyrene foam with different blowing agents based on data set forth in Example IV.

FIG. 4 shows a similar effect for a mixed FC-12/i-PrOH blowing agent within the scope of the present invention on a 50/50 blend of polystyrenes having weight average molecular weights of approximately 200,000 and 300,000, respectively.

Table IV below summarizes all data for on-line steam expansion in terms of steam exposure time for a 10% reduction in foam density. The data have been normalized for a 1.0 inch diameter, 2.0 pcf polystyrene foam.

TABLE IV

| Polymer Type | Blowing Agent | Azido Silane Level (pph) | Time (sec.) for 10% Reduction in Density |
|---|---|---|---|
| A | FC-12/EtOH:70/30 | — | 4.6 |
| A | FC-12/EtOH:70/30 | 0.5 | 3.9 |
| B | FC-12/EtOH:70/30 | — | 6.9 |
| B | FC-12/EtOH:70/30 | 0.2 | 4.8 |
| B | FC-12/EtOH:70/30 | 0.5 | 3.8 |
| B | FC-12/i-PrOH:70/30 | — | 8.2 |

A = polystyrene having Mw = 200,000
B = 50/50 blend of polystyrenes having Mw = 200,000 and 300,000, respectively As can be seen, foams made with blowing agents within the scope of the present invention expand rapidly.

Having described the invention in detail and by reference to preferred embodiments thereof, it will be apparent that modifications and variations are possible without departing from the scope of the invention defined in the appended claims.

What is claimed is:

1. A process for the preparation of an expanded polymeric foam comprising the steps of:
   (a) melt processing under pressure an alkenyl aromatic polymer having a glass transition temperature of between about 60° to about 100° C. together with a volatile blowing agent to form a flowable admixture, said volatile blowing agent comprising a mixture of from about 40 to about 90% by weight of a primary blowing agent comprising dichlorodifluoromethane, and from about 10 to about 60% by weight of a secondary blowing agent comprising a halogenated hydrocarbon, a hydrocarbon, or an aliphatic alcohol containing from 1 to 4 carbon atoms, said halogenated hydrocarbon, hydrocarbon or aliphatic alcohol having a normal atmospheric boiling point of from about 0° to about 100° C.,
   (b) extruding said admixture through a die to a zone of lower pressure and activating said blowing agent to expand said alkenyl aromatic polymer to a cellular structure, and
   (c) exposing said cellular structure to steam at substantially atmospheric pressure to expand further said cellular structure to a foam of lower density.

2. The process of claim 1 in which said alkenyl aromatic polymer is polystyrene.

3. The process of claim 1 in which said alkenyl aromatic polymer is a copolymer of styrene and acrylonitrile.

4. The process of claim 1 in which said volatile blowing agent is present in an amount of from 10–30 parts per hundred of said alkenyl aromatic polymer.

5. The process of claim 1 in which said volatile blowing agent comprises from about 60 to about 80% by weight dichlorodifluoromethane and from about 20 to about 40% by weight trichloromonofluoromethane.

6. The process of claim 1 in which an azido functional silane crosslinking agent is added in step (a).

7. A process for the preparation of an expanded polymeric foam comprising the steps of:
   (a) impregnating a volatile blowing agent into a granular alkenyl aromatic polymer having a glass transition temperature of between about 60° to about 100° C., said volatile blowing agent comprising a mixture of from about 40 to about 90% by weight of a primary blowing agent comprising dichlorodifluoromethane and from about 10 to about 60% by weight of a secondary blowing agent comprising a halogenated hydrocarbon, hydrocarbon, or an aliphatic alcohol containing from 1 to 4 carbon atoms, said halogenated hydrocarbon, hydrocarbon, or aliphatic alcohol having a normal atmospheric boiling point of from about 0° to about 100° C.,
   (b) heating said granular alkenyl aromatic polymer to activate said volatile blowing agent and expand said granular alkenyl aromatic polymer to a cellular structure, and
   (c) exposing said cellular structure to steam at substantially atmospheric pressure to expand further said cellular structure to a foam of lower density.

8. The process of claim 7 in which steps (b) and (c) occur substantially simultaneously and said steam supplies the necessary heat to activate said volatile blowing agent.

9. The process of claim 7 in which said alkenyl aromatic polymer is polystyrene.

10. The process of claim 7 in which said alkenyl aromatic polymer is a copolymer of styrene and acrylonitrile.

11. A process of claim 7 in which said volatile blowing agent is present in an amount of from 10–30 parts per hundred of said alkenyl aromatic polymer.

12. The process of claim 7 in which said volatile blowing agent comprises from about 60 to about 80% by weight dichlorodifluoromethane and from about 20 to about 40% by weight trichloromonofluoromethane.

13. The process of claim 7 in which an azido functional silane crosslinking agent is added to said alkenyl aromatic polymer in step (a).

* * * * *

UNITED STATES PATENT AND TRADEMARK OFFICE
CERTIFICATE OF CORRECTION

PATENT NO. : 4,681,715
DATED : July 21, 1987
INVENTOR(S) : Chung P. Park and Gerald A. Garcia It is certified that error appears in the above-identified patent and that said Letters Patent is hereby corrected as shown below:

Column 5, line 45, "styringe-type" should read --syringe-type--.

Columns 9 and 10, Table IIA, "(11) = pressure at the die in kilogram per square centimeter at the sampling die opening" should read --(11) = pressure at the die in kilograms per square centimeter at the sampling die opening--.

Columns 13 and 14, TABLE IIIC, "Expansion Ratio after Expanding in Hot Air at 115° C. for (min.) (6)" is typed in the wrong place. The subtitle should be place next to the subtitle Initial Expansion Ratio (5).

Columns 15 and 16, TABLE IIIC-continued, next to the subtitle Initial Expansion Ratio (5) should be typed, --Expansion Ratio after Expanding in Hot Air at 115° C. for (min.) (6)--.

Signed and Sealed this

Seventeenth Day of May, 1988

Attest:

DONALD J. QUIGG

*Attesting Officer*  *Commissioner of Patents and Trademarks*